W. M. INGRAM.
SEAL MAKING MACHINE.
APPLICATION FILED FEB. 9, 1918.

1,293,787.

Patented Feb. 11, 1919.
7 SHEETS—SHEET 1.

Witnesses.
Porter H. Flautt.
Alice G. Donegan.

Inventor
Walter M. Ingram
By Edwin K. Samuels
Attorney

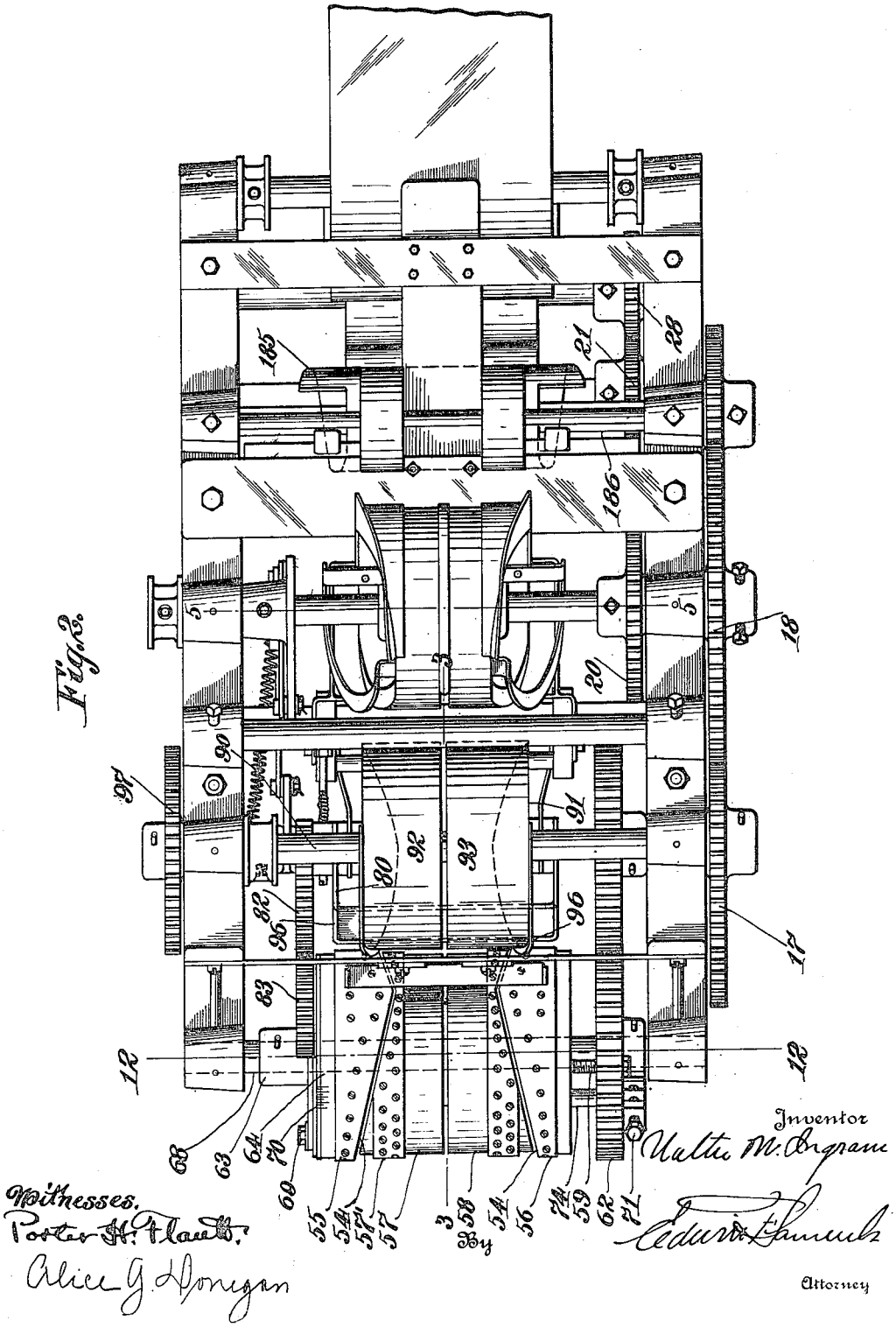

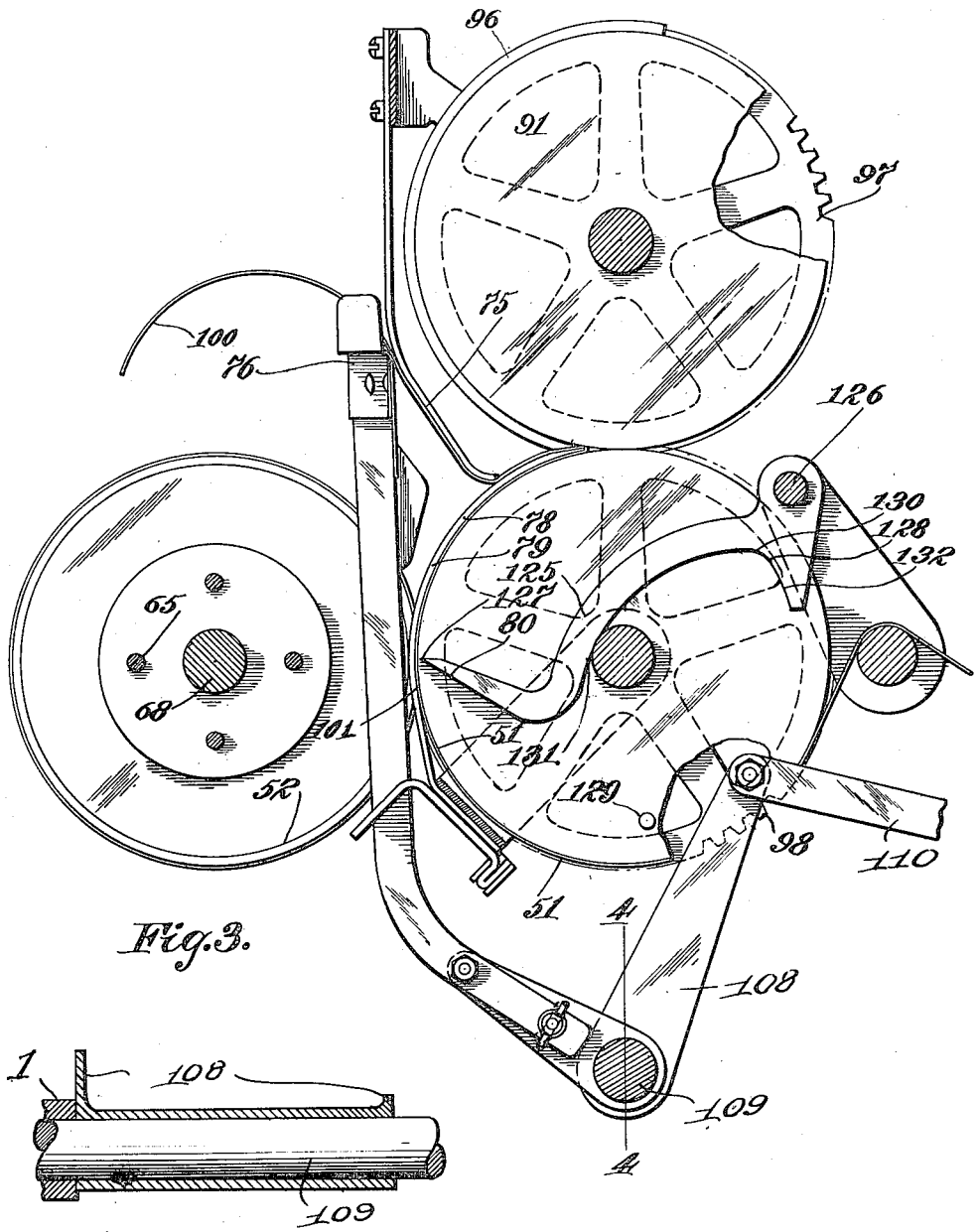

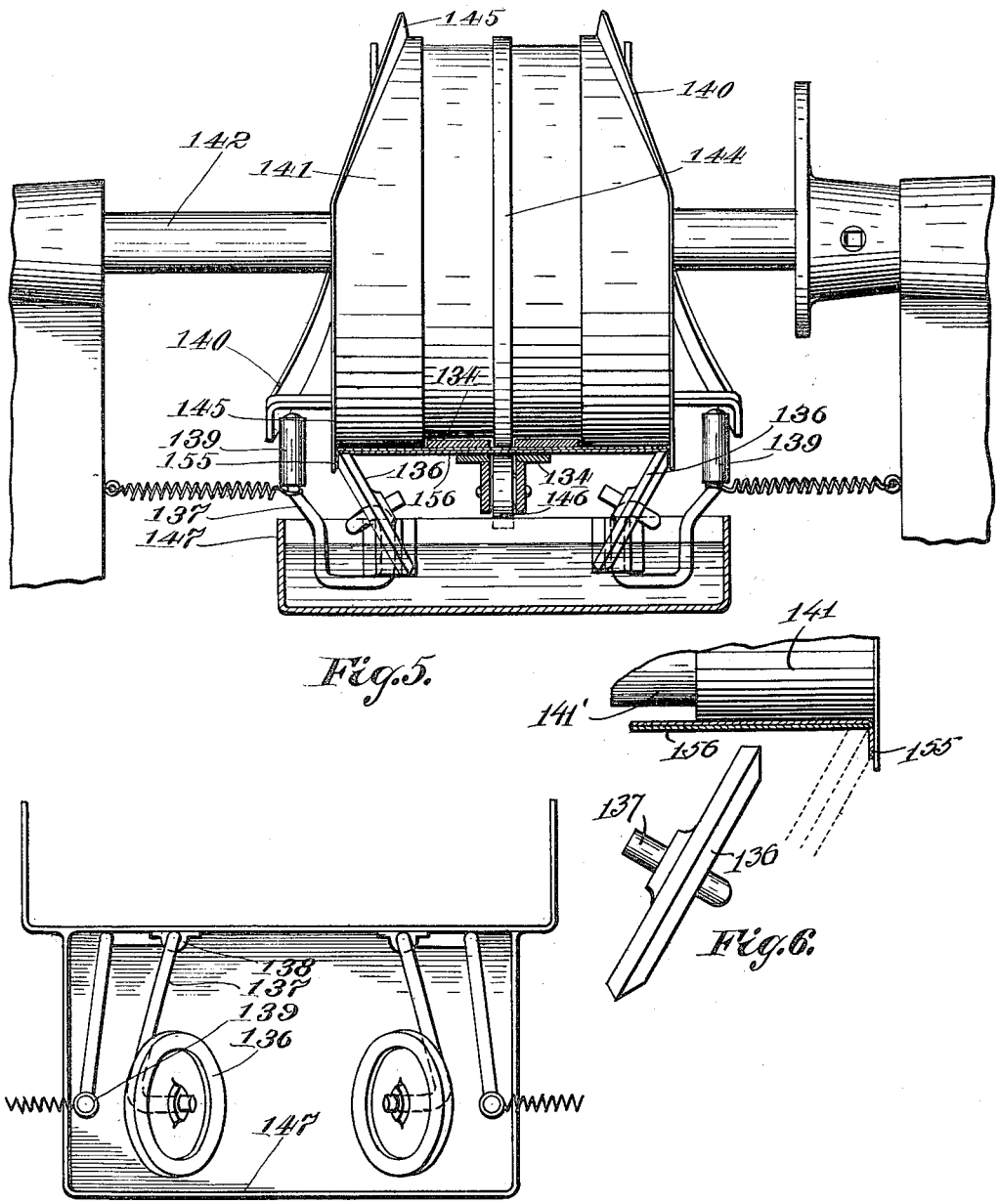

W. M. INGRAM.
SEAL MAKING MACHINE.
APPLICATION FILED FEB. 9, 1918.

1,293,787.

Patented Feb. 11, 1919.
7 SHEETS—SHEET 5.

Witnesses.
Porter H. Flautt
Alice G. Donegan

Inventor
Walter M. Ingram
By Edwin Samuels
Attorney

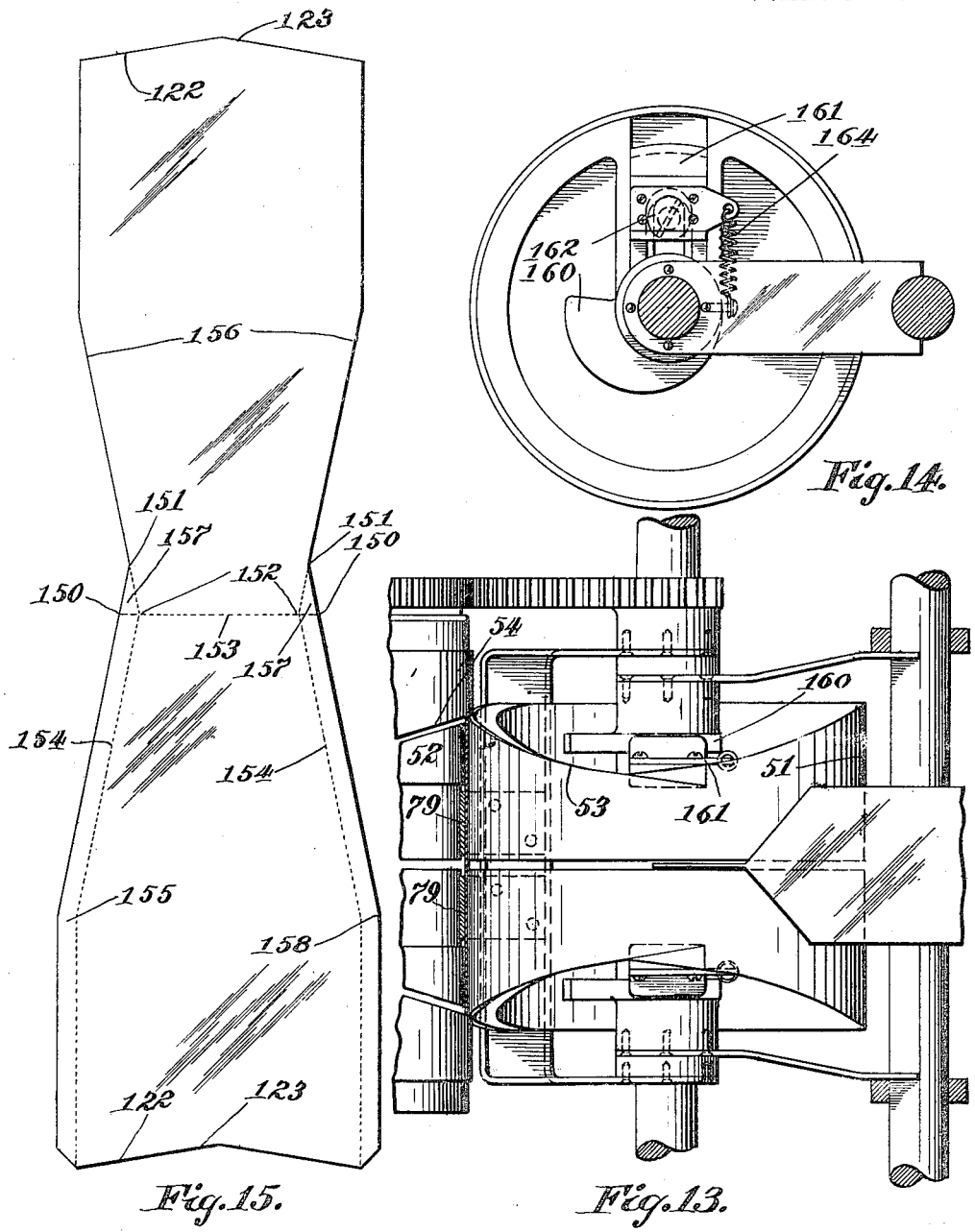

UNITED STATES PATENT OFFICE.

WALTER M. INGRAM, OF BALTIMORE, MARYLAND, ASSIGNOR TO ALBERT W. FUSS, OF GLYNDON, MARYLAND.

SEAL-MAKING MACHINE.

1,293,787.  Specification of Letters Patent.  Patented Feb. 11, 1919.

Application filed February 9, 1918. Serial No. 216,323.

*To all whom it may concern:*

Be it known that I, WALTER M. INGRAM, a citizen of the United States of America, residing in Baltimore, State of Maryland, have invented certain new and useful Improvements in Seal-Making Machines, of which the following is a specification.

The machine which is the subject of this application is for use in the manufacture of bags, wrappers or seals, particularly adapted for wrapping and closing or sealing bottles. My invention has been developed in connection with the wrapping of milk bottles but it is capable of general application.

The machine in the preferred form illustrated operates by cutting from a web, blanks of twice the length of the seals or bags to be produced, folding them about a transverse central line, turning the edges of one-half over the edges of the other half and pasting them. The bags or seals in the preferred form are tapered or reduced at the closed end and of angle to suit the bottle.

Other machines having as a principal function the manufacture of similar seals or bags have been produced. The object of the present invention is the development of a machine for the manufacture of the seals described which is more compact, cheaper in construction, and quicker in operation than the machines of this general type heretofore produced.

In the accompanying drawings I have illustrated a machine embodying my invention in the preferred form.

Fig. 2 is a top plan;

Fig. 3 is a view of the cutting and folding mechanism, the same being a section on the line 3, 3, of Fig. 2;

Fig. 4 is a section on the line 4, 4 of Fig. 3;

Fig. 5 is a vertical section on the line 5, 5 of Fig. 2;

Fig. 6 is a view showing the relative positions of the paste roller when in the pot and in operation on the paper;

Fig. 7 is a plan view of the paste pot and the paste rollers with their levers;

Fig. 13 is a fragmentary plan showing the rear cutting roller and a portion of the front cutting roller;

Fig. 14 is a side elevation of the rear cutting roller and the cam for actuating the movable or disappearing portion of the cutting edge of said roller; and Fig. 15 is a plan of a blank and may be taken as a development of the cutting edges of the cutter rollers.

Figure 1:
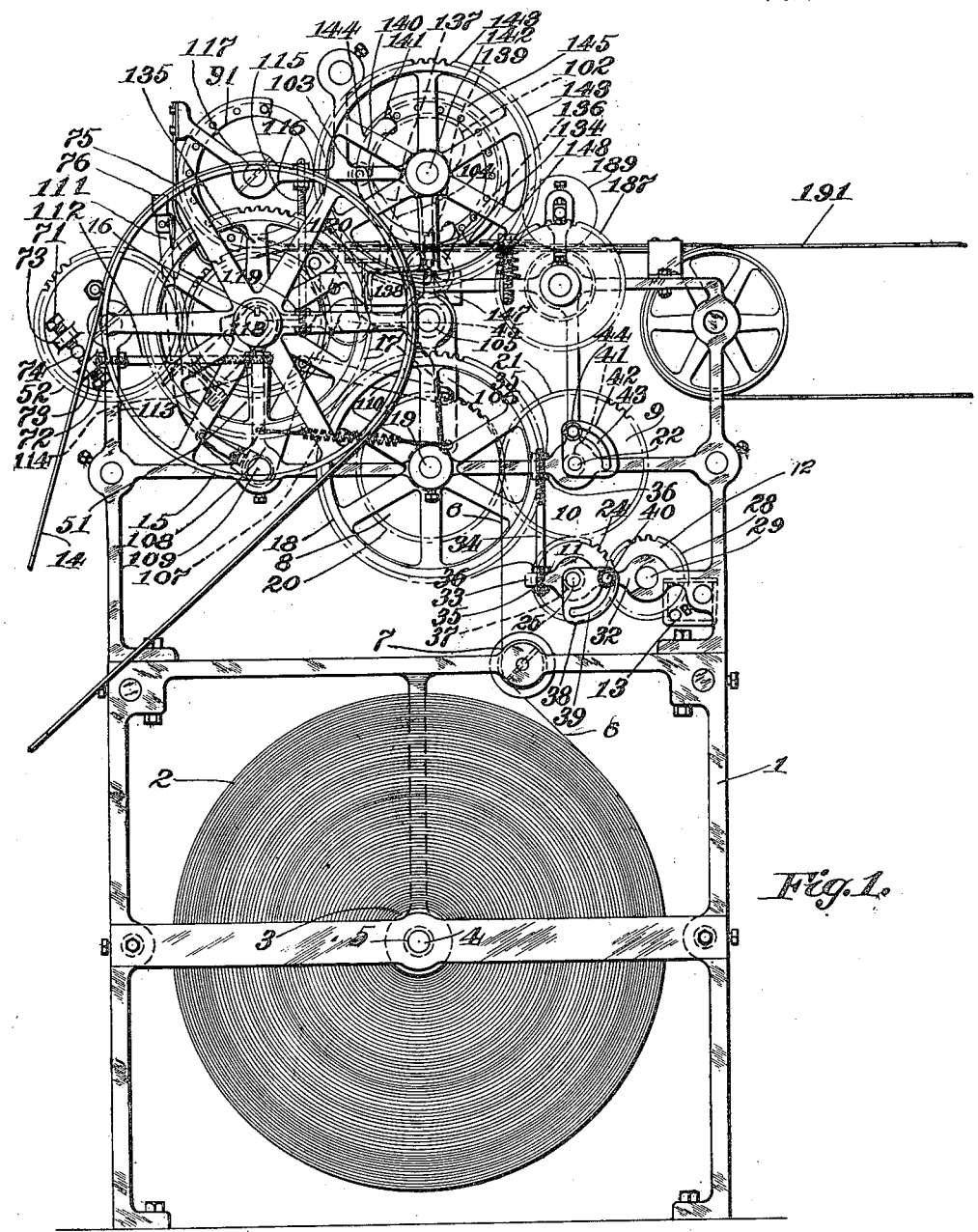
Figure 1 is a side elevation of the machine.
Figure 8:
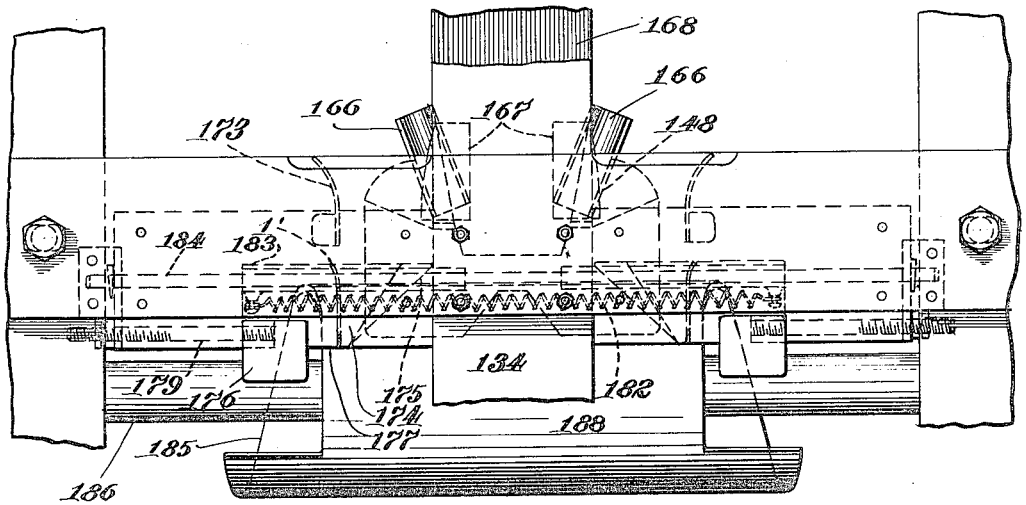
Fig. 8 is a plan of the tubular folding mechanism which operates on the side flaps.
Figure 9:
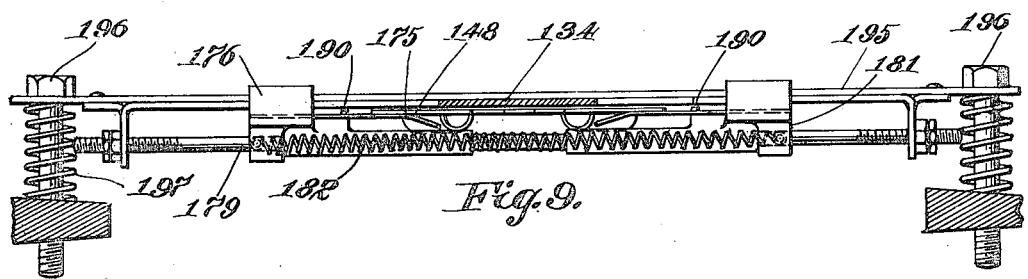
Fig. 9 is an elevation of the same looking in the direction of the arrow in Fig. 8.

Referring to the drawings by numerals, there is a frame 1 upon which is supported preferably at the lower central portion, a roll of paper 2 on a suitable roller 3 having journals 4 in suitable bearings 5 in the machine frame. The web of paper 6 is drawn from the roll 2 over a suitable guide roller 7 whence it is led directly into the bite of the take-off and printing rollers 8 and 9, the latter being in the present instance provided with type 10 by means of which the web from which the seals are to be cut is inscribed with any desired marking. The type 10 is inked by a suitable inking roller 11 which receives its supply of ink from an ink-carrying roller 12 dipping in an ink reservoir 13.

The machine is driven by a belt 14 which runs over a pulley 15 on a shaft 16 which latter shaft carries a toothed gear 17 meshing with a toothed gear 18 on a shaft 19 of the roller 8 which shaft in turn carries a toothed gear 20 meshing with a toothed gear 21 on a shaft 22 of the roller 9. This toothed gear 21 also meshes with a toothed gear 24 on the shaft 25 of the inking roller 11. This gear 24 in turn meshes with a gear 28 on the shaft 29 of the ink-carrying roller 12. The rollers 8, 9, 11 and 12 being each fast on its shaft are thus driven in accordance with the functions stated.

The shafts 25 and 29 of the rollers 11 and 12 are journaled in an arm 32 of the frame 1 which is of the cantaliver type, i. e., joined to the frame at one end only so that it is slightly flexible, the outer end 33 being connected to a portion of the frame above by a bolt 34, the tension and compression in the bolt being adjusted by nuts 35 and 36 respectively, providing a convenient regulation of the contact between the rollers 9 and 11. Adjustment of the contact between the rollers 11 and 12 is provided by means of an eccentric 37 on the shaft 35 controlled by a segment 38 having an arcuate slot 39 engaged by a bolt 40 in the bracket 32. The adjustment of the grip of the printing or take-off rollers 8 and 9 is accomplished by means of an eccentric 41 on the shaft 22, the eccentric being controlled by a segment 42 having an arcuate slot 43 engaged by a bolt 44 seated in the machine frame.

From the grip of the rollers 8, 9, the paper web is led over the top surface of the shaft 45 and then clockwise about the rearmost cutting roller 51. The coöperating cutting rollers consist of a front roller 52 and the rear roller 51.

It will be noted that the rollers 51 and 52 are in effect an inside and outside cylindrical die respectively, that is, the roller 51 has a cutting edge 53 in the form of a blank and the roller 52 has oppositely disposed cutting edges 54 of the same form or rather of the same outline which fit over or receive the cutting edges 53 between them. One die or cutting edge 53 rolls into the other die or cutting edge 54 with a shearing action, cutting a blank of the desired form from the web as it is passed between the rollers.

As has already been explained, the blanks are twice the length of the finished seals or bags, being folded upon a transverse central line as hereinafter described, the edges of one-half being turned over the edges of the other half so that the dies or rather the cutting edges, in their outline correspond to a figure similar to the blank which, divided on a line corresponding to the transverse central fold of the blank, consists of two separate sections similar except that the width of one exceeds the width of the other by a narrow margin corresponding to the flap on the large half of the blank which is paste-coated and folded over the edge portion of the smaller half of the blank. This relation of the two sections has a bearing on the operation of the machine as hereinafter described.

As has been stated, the rear cutting roller or inner die 51 fits inside the cutting surfaces of the front cutting roller or outer die 52. Both the rollers or dies for purposes of construction are made in parts. The roller 52 consists of four parts, 55 at one end carrying one cutting edge, 56 at the other end carrying the other cutting edge, and 57 and 58 on each side of the center forming the depressed portion of the roller, the same being faced with rubber 57' to bear on the central portion 67 of the rear cutting roller 51 to grip the paper as it passes between the rollers. The central sections 57, 58 are bolted together by means of bolts 65 and fastened to the shaft by pins 66. The cutting edges 54 of the front cutting roller 52 are adjusted by drawing them together against the cutting edges of the roller 51 by means of the bolt or lag screw 59 bearing against the outer section 56. The screw 59 is seated in the gear 62 which is secured to the shaft 68 of the front cutting roller, adjustment being accomplished by drawing the edges together between this bolt and the disk 63 pinned on the shaft and serving as a stop or abutment against which one-half 55 of the front cutting roller or die rests. It will be understood that there is normally sufficient play between the sections 55 and 57 and 56 and 58, 55 and 56 being mounted to slide along the shaft, to permit adjustment of the cutting edges in this way by taking up part of the play, the said cutting edges being spaced by the inner cutting edges 53 with which they are in contact.

The cutting roller 51 has its cutting edge 53 forming the internal cutting die arranged to correspond precisely with and fit into the cutting edge 54 of the forward cutting roller or external die 52. This rear cutting roller 51 is made in two parts 87 and 88 pinned or otherwise rigidly secured to the shaft 16 and preferably spaced by stops 89. Inside the cutting edges, the surface of the roller 51 is level with these cutting edges and serves to contact with the rubber facing 57' of the roller 52 and grip the web and blank as it passes through.

Angular adjustment of the cutter sections 55 is accomplished as follows: The disk 63 is secured to the shaft and the section 55 which is otherwise free to rotate on the shaft, is secured to this disk by means of a bolt 69 seated in the cutter section and passing through an arcuate slot 64 in the disk. I also preferably provide the disk and cutter with a scale or vernier 70 so that the angular position of the cutter may be adjusted and determined, the bolt 69 being loosened, the cutter rotated to the desired position as indicated by the scale, and then made rigid by tightening the bolt. Adjustment of the other cutter section 56 is made by means of set screws 71, 72 seated in lugs 73 in the face of the gear. These set screws bear against a pin 74 which is between the set screws and extends parallel to the axis of the rollers, passing through a slot in the gear 62 and being seated in and rigidly secured to the cutter section 56. The manner of obtaining this angular adjustment is apparent. It consists in loosening one set screw and tightening the other depending upon the direction of the angular adjustment desired. The grip of the cutter rollers is adjusted by a bolt 112 drawing together the two upright arms 113 and 114 on which the rollers are mounted.

As the forward end of the blank, which is the larger end, protrudes from the rollers, it comes in contact with a stationary stop or shield 75 by which it is deflected as shown in Fig. 1, in which position it bends forward and downward by gravity resting on a support 76 provided for this purpose.

Coöperating with the support 76 and the shield 75 is the folder 78. This includes an arcuate plate or folder blade 79, or rather two such plates spaced apart to admit the cutter as hereinafter described. These plates pass between the cutting rollers 51, 52 near the center whereby they avoid the gripping surfaces 57'. At the lower end these plates are secured to a cross-bar 81 on radial arms 80 loose on the shaft 16, the arm 80 on one side being secured to the boss of a segmental gear 82 which meshes with and is driven by a segmental gear 83 carried by the flanged member 63 pinned to the shaft 68. The segmental gears drive the folder during the working stroke as hereinafter described, being returned to initial position by means of a spring 84.

Above the roller 51 on the shaft 90 is a folder roller 91 shown as made in two sections 92, 93, preferably spaced as shown, each section being pinned or otherwise rigidly secured to the shaft. The surface of this folder roller is adapted to run in rolling contact with the surface of the cutter roller 51 between the cutting edges. It is also provided with a substantially radial or slightly inclined flange or rib 96 having rounded non-cutting edges of outline to conform to and take over the lateral edges of the smaller cutting section of the inside cutting roller or die 51. The contact of these flanges with the cutting edges is not quite as close as that of the cutting edges 52 with the same cutting edges of the roller 51, the object of the flange or rib 96 being to fold or crease the edges of the larger half of the blank forming flaps to be turned over the edges of the smaller half of the blank, as hereinafter described. To this end, the roller 91 is driven rotatively by the toothed gear 97 on the shaft 90, meshing with a gear 98 on the shaft 16.

Referring now to Fig. 1, we have a side view of the front or outside die or cutting roller 52, the rear or inside die or cutting roller 51, the front folding roller 91, shield 75, the blank support 76, and the oscillating folder blade 78. When the blank, which in the form of the machine illustrated is cut large end first and of course feeds in the same relation, issues from the grip of the cutter rollers 51 and 52, it hangs or bends forward over the support 76 as illustrated at 100, Fig. 3. When the central portion of the blank where the transverse fold is to be, is approaching the grip of the cutter rollers at 101, the folder blades 78 which move through an arc of about 135° and in the drawing are shown in their uppermost position, i. e., at the end of the stroke, begin to move upward in right-handed rotation about the shaft 16, the beginning of the stroke of the folder blades being preferably simultaneous with the passing of the center of the blank by the end of the folder blade in its lower or normal position and with the cutting of this part of the blank. The blades make their upward or operative stroke at a speed substantially equal to the surface speed of the rollers 51 and 52, it being understood that the paper at this time is led over the surface of the roller 51 and between this roller and the folder blade 78. As the blank passes upward from the grip of the rollers 51 and 52, instead of being stripped from the rollers and led upward over the support 76, as is the forward end of the blank, the central portion of the blank is caught by the blade 78 and carried upward with and on the corresponding point of the roller 51 until it enters between and is gripped by the rollers 91 and 51. At this time the forward end is still on the support 76. The central portion of the blank thus doubled back over the folder blade is folded on a line transverse to the length of the blank and as it enters the grip of the rollers 91 and 51, it is duly pressed forming a transverse crease. The blank thus doubled is carried through the rollers, the blade as soon as it is released by the segments being retracted by the spring 84. During this operation, the front end of the blank is drawn over the support 76 and around the edge of the shield 75, being given a tension to correspond to the tension of the rollers 51 and 52 by means of the support 76 which at this time is pressed against the shield 75. This effect is intermittent being accomplished only when the doubled blank is passing into the grip of the rollers 91 and 51. It is produced by means of a cam 102 engaging a roller 103 on a lever 104, intermediately pivoted on the machine frame, the remote arm 106 of the lever hanging below the pivot being connected by a spring 107 with a suitable point on the frame, the tension of the spring having the effect of keeping the roller in contact with the cam by means of a connecting rod 110. The arm 106 transmits the motion of the cam to a bell crank 108 pivoted on the shaft 109 seated in the frame 1. The other arm of the bell crank 11 carries the support 76 which is by the action of the cam and levers described caused to rock into contact with the guide 75 at suitable intervals to put the necessary tension on the forward end 100 of the blank during the time when the blank intermediately folded is passing between the rollers 51 and 91.

During the passage of the doubled blank between these rollers 51 and 91, the flange 96 on the last named roller engages the overhanging edges or flaps of the large half of the blank, folding them downward and past the corresponding edges of the small half of the blank.

Fig. 15 is a plan of the blank or a development of the cutting edges of either cutting roller. In this blank or development of the cutting edges, it will be noted that there is at the center of each lateral edge, i. e., near the narrowest point a triangle 150, 151, 152 defined by the outer edge of the flap, the crease 151, 152 in alinement with the edge of the smaller half of the blank and the crease 152, 150 in alinement with the transverse fold 153 about which the blank is doubled. The lines 154 are the creases upon which the flaps 155 are turned about the edges of the smaller half of the blank 156. The triangles 157 at the time of folding the blank are first turned about the line 150, 152, each of which is a continuation of the line 153. Then when the flaps 155 are turned down by the action of the creaser, the triangles 157 are completed by the formation of the creases 151, 152 at the time in coincidence with or overlying the creases 154. As both the cutting edges 53 and 54 conform to the outline of the blank, and creases 154 and 151, 152 are formed by the coöperation of the creasing roller and the small half or lobe of the cutting member of the internal cutting die 51, it is apparent that in order to form this crease the outline of the internal cutting die must be changed between the cutting and the creasing operation. This is accomplished by making the triangles 157 separate from the rest of the die and giving them an in and out motion relatively to the roller at each revolution causing them to be in the cutting or outermost position during the cutting operation and withdrawn during the creasing operation. This is accomplished by the mechanism illustrated in connection with the roller 51 in Figs. 13 and 14, consisting of a stationary cam 160, a sliding member 161 mounted in the roller 51 to slide radially thereon, and a follower 162 thereon engaging the cam 160. The sliding member 161 carries at its end a triangular portion 150, 151, 152 having a cutting edge 150, 151. In the preferred form of the invention, the cutting rollers are made of cast iron and the cutting edges are of tool steel strips or bands 163 on which the cutting edge is formed. This band overlies the sliding member 161 adjacent the triangular portion 150, 151, 152 and the parts are so proportioned that it serves as a stop to prevent the triangular member from advancing beyond its normal cutting position. The follower is kept in contact with the cam by a spring 164 which tends to withdraw the sliding member toward the center of the roller.

The grip or contact pressure between the rollers 51 and 91 is regulated, adjusted and determined by means of rods 115 passing through arms 116 of the frame of the machine which extend forward horizontally and are unsupported at the forward ends where the roller 91 is journaled at 117. This arm 116 thus possesses a considerable amount of resiliency which is taken advantage of in the adjustment of the grip. These rods 115 are passed through the arms 116 and a corresponding rigid portion of the frame 118. The rods 115 are threaded at each end and have at each end nuts 119 and 120 on each side of the portion of the frame in which they are seated so that the adjustment by tightening and loosening the nuts in an obvious manner is had, setting up tension in the rod or releasing it, drawing the rollers together or moving them apart.

The cutting rollers 51 and 52, or more correctly the cutting edges thereof, are arranged to cut one blank at each revolution. In the preferred form, the blank is just long enough to encircle the roller, that is, there is one transverse cutting edge parallel to the axis of the roller by means of which the ends of the blanks are formed or cut. This transverse cutting edge 122 on each roller is omitted or cut away centrally at 123 so that the blanks are not completely cut or severed from the material when released from the cutter rollers. A tab is left which connects the blank in the grip of the folder or creasing roller 91 and the rear cutting roller 51 with the web of material and serves to draw the web forward into the grip of the cutter rollers after the cutting of the preceding blank, and is not severed until this is accomplished.

The cutting of this tab or connecting link is effected by means of an oscillating cutter 125 shown in detail in Fig. 3. This cutter, which is mounted to swing about a stud 126 extending through the machine frame, consists of a blade 127 and a concave cam portion 128. The blade 127 in the normal position or position of rest of the parts is preferably near, usually a little above, the point of contact of the two cutting rollers. The blade 127 and the cam 128 are centrally placed being between the two sections of the roller 51. The cutter is actuated by a pin or follower 129 fixed to the roller 51, the pin or follower engaging and coöperating with the cam surface 128 throughout the operative stroke of the cutter. In the normal or position of rest of the parts, the cutter swings down to its lowest position, the cam 128 resting on the shaft 16. As the pin 129 swings upward from its lower central position, it comes in contact with the cam and swings the cutting edge 127 forward and upward causing it to engage and sever the tab connecting the blank just cut from the web after the latter has been drawn into the grip of the rollers. It will be understood that during this operation, the pin 129 follows the concave cam surface 128 from the present position of the pin as illustrated at one end of the cam surface to the sharp bend 130 where the two portions 131 and 132 meet. As the operation of cutting is completed, the pin 129 passes the curve 130 and engages the surface 132. While contact with the curve 131 serves to lift the cutter, the contact of the pin with the curve 132 serves to return the cutter, i. e., swing it downward into original position where it rests on the shaft 16. This motion is of course the result of the combination of the curve of the cam with the circular path followed by the pin 129 and the rotation of the cutting roller 52. It constitutes the cutting stroke and the withdrawal therefrom. The tab connecting the blanks is narrower than the opening between the sections of the cutter roller 51, see Fig. 15, and overlies this opening. The blade 127 is of suitable width and passes through this opening at each stroke of the cutter and severs from the web the blank which has just passed the grip of the cutter rollers.

As the blank thus severed from the web and creased as to its flaps emerges from the grip of the rollers 51 and 91, it enters the ways 134 in alinement with the horizontal tangent plane at the point of contact of these two rollers. These ways 134, which are composed of two flat plates or strips placed horizontally one over the other and spaced apart to admit the bags or seals, are slightly less than the width of the latter and open at the edges. Spaced back from the grip of the folder roller 91 by substantially the length of the finished seals are paste rollers 136 working in a paste pot 147 and engaging the blank from beneath on either side of the ways. The periphery of these rollers is of V-shaped cross-section and each is mounted on a U-shaped bracket or arm 137 pivoted intermediately in the machine frame at 138. The bearing of the roller is at one end of the U and the other end is formed into a cam follower 139 engaging a cam surface 140 on a roller 141 on the shaft 142, driven by the gear 143 from the gear 17 on the shaft 16. This cam or cam member 140, which has duplicate cam paths to engage both of the arms 137 so as to actuate both of the paste rollers 136, has an outline corresponding to the outline of the seal so as to move the rollers laterally and cause them to follow the configuration of the edge flap. It will also be noted that the rollers 136 having the V-shaped periphery are tipped with their axes at an angle of approximately 60° so that one face of the V lies in a vertical plane and the other in a horizontal plane. The roller 141 in addition to the cam 140 includes a raised portion 144 extending around approximately two-thirds of the periphery. This coöperates with a small roller 146; both rollers operate in slots in the ways to grip the blank and draw it forward at the time when the paste rollers are spaced to engage the flaps at the corresponding end, in this case the closed end or bottom of the bag or seal. It will be noted that roller 141 is, as shown, cut away at the center of its peripheral surface forming a groove 141' which receives the top way 134. The bottom way is cut away at the section at this point to provide for the side motion of the paster rollers, so that they can follow the edges of the flaps. The roller 141 also carries a radial flange or rib 145 shaped to the periphery of the finished seal. This coöperates with the paste rollers engaging the turned flaps from without and supporting them while the vertical paste roller engages them from within, the other paste roller engaging the adjacent edge surface of the other half of the blank so that the two surfaces, i. e., the flap and the adjacent portion of the small half of the blank, which are to be brought into contact on the finishing of the seal or bag, are paste-coated simultaneously.

As the blanks are fed from the grip of the creasing or folder roller 91 and the rear cutting roller 51, they are released when the closed ends reach the gripping point of the roller 141 with the small roller 146. On account of the fact that the raised portion 144 which forms one element of the gripping surface is discontinued for a considerable portion of the circumference, the bag or seal stops at this point until the paste rollers reach the operative position. Then the bag is fed forward, the flaps which are already creased being turned to vertical position by the flange or rib 145. This flap is engaged from within by the vertical surface of the paste roller and the portion of the smaller half of the blank which is to be engaged by the flap engaged by the horizontal face of the paste roller. When the blank, which is at the same time guided by the ways, thus folded and paste-coated as to its edges, emerges from the grip of the rollers 141 and 146, it enters a static or tubular folder member 148 wherein the paste-coated flaps of the larger half of the blank are turned flat against the paste-coated edges of the small half of the blank.

Figure 10:
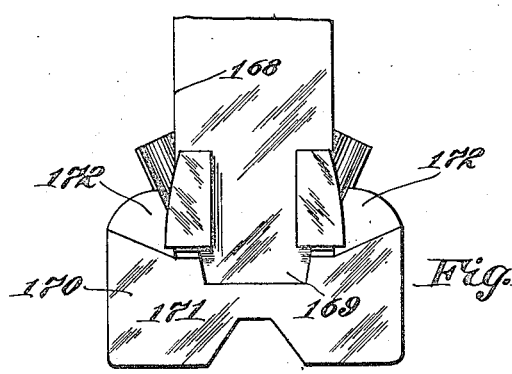
Fig. 10 is a plan of the folder.
Figure 11:
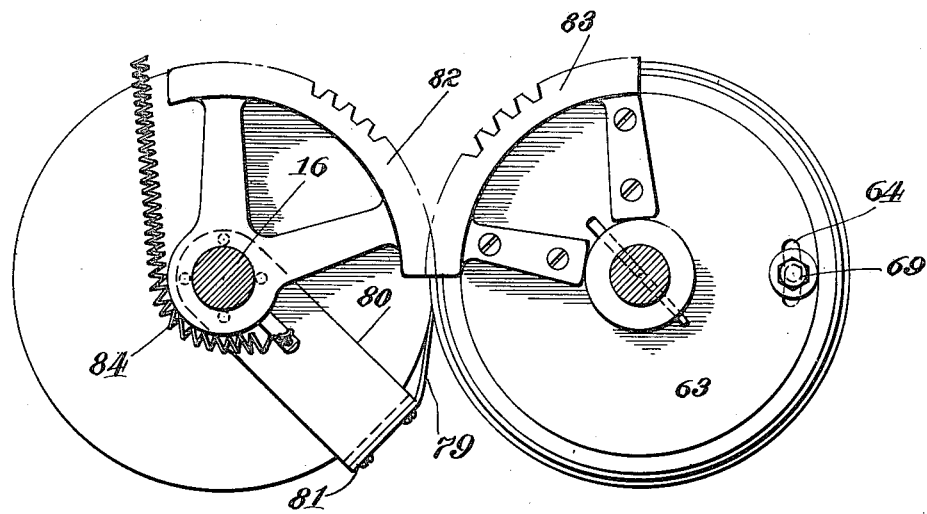
Fig. 11 is a view of the segmental gears for operating the folder fingers, looking from the opposite side of the machine from that seen in Fig. 1.
Figure 12:
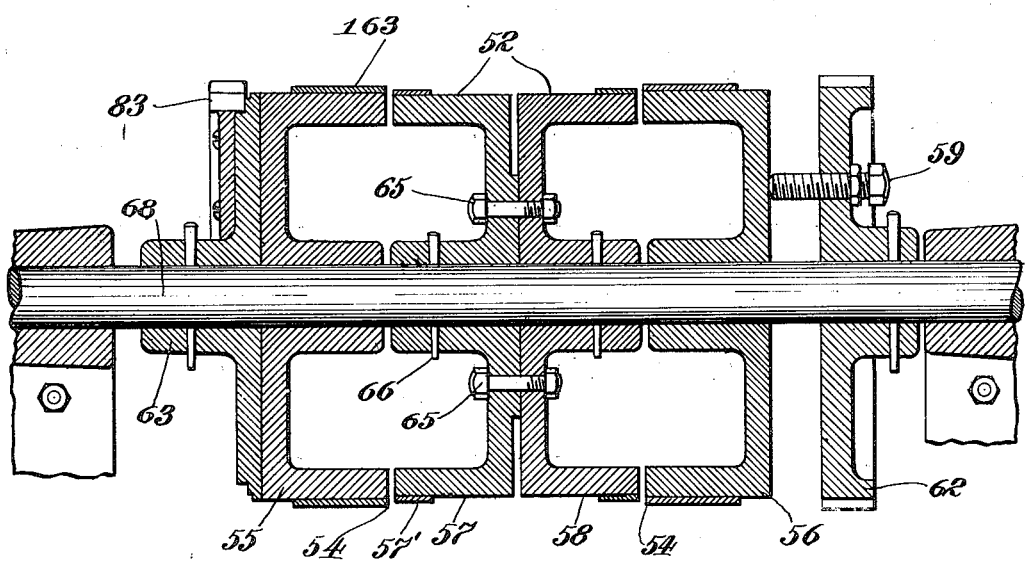
Fig. 12 is a vertical section on the plane of the axis of the front cutter roller, the same being taken on the line 12, 12 of Fig. 2.

This static or tubular folder 148 includes two converging guides 166 adapted to engage the depending pasted flaps 155 turning them against the paste-coated edges of the smaller half of the blank 156. The converging arrangement of these guides, their inward inclination exceeding that of the edges of the blank, is such as to effect this to the best advantage. In the form shown, they are of half circular cross-section, i. e., tubes cut on the plane of the axis. Just over the tubes are flat plates 167 adapted to enter the fold and define it as to the initial extremity and over these is the top plate of the ways 134, the same being removed in the Fig. 10 referred to. The bottom plate in the way is indicated in this figure by reference character 168. This terminates at 169 and the places of the bottom plate is supplied by a bottom folder plate 170 which is flat as to its rear surface 171 and inclined as to its forward or receiving end 172. There is also a side guide 173 at this point.

Referring to the development of the blank, it will be noted that in the form shown, the flap 155 makes a shoulder or turn forming a shoulder 158 so that in the initial folding operation, the fold would terminate near this point by reaching the edge of the paper. To turn the edges of the paper at 158, I provide moving folders 174 in the form of plates having inclined edges 175. Each of these plates has a follower 176 secured thereto and slotted to engage the edge of a guide plate 177 having an overhanging portion or bracket 178 through which is passed a bolt 179 with lock nuts 180 outside the bracket, the bolt being seated at its other end in the follower 176 and serving as means for limiting the inward motion of the followers. These and the folders are drawn in by the springs 182 engaging the sleeves 183 sliding on a transverse rod 184, each sleeve being secured to the finger 174 by means of a web 181. These folder fingers are controlled by cams 185 on the shaft 186 driven by a gear 187 from the gear 143 which is on and drives the shaft 142, the same being in turn driven from the gear 17 on the shaft 16. The cam 185 is formed of a cylindrical member having roller surfaces 188 to coöperate with idler rollers 189 which rest on the paper from above and serve to roll the flaps in their folded position, it being understood that after the shoulders 158 are turned by the folder fingers, the drawing of the flap over the plate 171 serves to turn these edges, the same being partly determined as to their position by the guides or stop surfaces 190 upon the fingers, and it is after emerging from the grip of this plate that the folded edges are engaged by the rollers 188 and 189 as already described, from which point they continue a short distance through the guides and are delivered on to the conveyer belt 191.

A transverse plate 195 supports the guide plate 177, the ways 134 at this point and the folder 170. At its ends, this plate 195 is mounted on vertical bolts or studs 196 seated in the frame, the ends of the plate being apertured to slide up and down on the bolts. Spiral springs 197 encircling the bolts and resting on the frame support the plates from beneath. This flexible arrangement permits the guides and folder to yield freely and conform to the position and contact point of the rollers and coöperating parts.

The machine consists of a series of groups of mechanism each operating on the web or upon the blanks cut from the web successively to produce a single result, i. e., a product in the form of seals or bags for covering bottles. These groups of mechanism are arranged along the path of the web and blanks in the order of their operation.

Referring to Fig. 1 which shows the web and the various groups of parts in their operative relation, the web 6 is drawn from the roll 2 whence it passes over the guide 7 into the grip of the printing or take-off rollers 8, 9. The type 10 on the roller 9, inked by the inking rollers 11, 12, prints any desired legend on the web, ink being supplied to the rollers 11, 12 from the ink pot 13. From the grip of the rollers 8, 9, the paper is led over the shaft or rod 45 into contact with the cutting roller 51 around which it passes clockwise into the grip of the cutting rollers 51 and 52 where the blanks are cut by the coöperating action of the cutting edges 53, 54 thereon. The forward end of the cut blank is guided upward by the shield 75 and bends forward and rests over the support. 76. When the central portion of the blank comes opposite the ends of the folder blades 79, these folder blades which oscillate about the center of the roller 51, swing upward with the blank or rather follow the center of the blank upward, folding it about the edge of the folder blade and thrusting the transverse fold thus formed into the grip of the rollers 51 and 91. The mechanism is so timed that the blank thus folded, the larger section over the smaller section, overlies the small lobe or section of the outline of the cutter edge on the roller 51. Corresponding to this, there is a flange or rib 96 on the folder roller 91 which serves to turn the overlying edge of the large half of the blank about the cutting edge corresponding to the small half of the blank, and incidentally over the corresponding edge of the small half of the blank. To permit the blank to be thus folded, it is necessary to withdraw two small portions of the cutting edge of the roller 51. These are mounted on triangular portions of the surface of the roller corresponding to the triangles 150, 151, 152 in Fig. 15. This is accomplished by a cam action already described. The blank thus folded then enters the ways 134 where it rests or dwells until engaged and carried forward by the fragmentary circumferential raised portion 144 of the roller 141 coöperating with the idler roller 146. When the blank is thus engaged and carried forward, the paster rollers 136 are suitably spaced to contact and coat the surfaces of the flaps 155, already turned up by the action of the roller 91 or the rib thereon. These paster rollers have on their peripheries two surfaces at right angles so that one surface contacts the flaps 155 from below or within and the other a margin of the small half of the blank to be engaged by the flap when folding is complete. On account of the varying width of the blank at different points in its length, the rollers swing laterally to conform to the outline of the blank, being controlled by cams 140 acting on the followers 139 on the centrally pivoted U-shaped levers 137 which carry the rollers. In coating the edges of the blanks, the rollers are pressed laterally by the levers 57 against the flanges 155. This lateral pressure moves each roller up the inclined end of its lever on which it is journaled, causing it to take the position shown in Fig. 5, pressing both surfaces of the roller against the corresponding surfaces of the blank at its folded edge. When the blanks are thus coated as to their flaps and edges, they are carried on, to and through the tubular folding guide 170 which turns the flaps flat against the edges of the small half of the blank, in which position they are pressed by the action of the idler rollers 189 coöperating with the cam roller 188. The operation of the machine is of course continuous and in the form described it is capable of operating at a high speed producing a product of a uniform and high quality.

The machine of the invention has the important advantages of compactness, simplicity and economy as to cost of construction as well as speed of operation and low cost of attendance.

I have thus described my invention specifically and in detail in order that its nature and operation may be fully understood; however, the specific terms herein are used descriptively rather than in their limiting sense and the scope of the invention is defined in the claims:

1. In a machine for making bottle seals, a pair of rotary dies, a folder roller in contact with one of the dies, a folder blade and means for actuating the same to engage the blank intermediately and thrust it into the grip of the cutter and folder rollers.

2. In a machine for making bottle seals, a pair of rotary dies, a folder roller in contact with one of the dies, a folder blade and means for actuating the same to engage the blank intermediately and thrust it into the grip of the cutter and folder rollers to crease the edges of one-half of the blank.

3. In a machine for making bottle seals, a pair of cutter rollers, a folder roller in contact with one of the dies, a folder blade, means for actuating the same to engage the blank intermediately and thrust it into the grip of the cutter and folder rollers to crease the edges of one-half of the blank in order to form projecting flaps on that half of the blank to fold over the edges of the other half, and means for coating the contacting portions of the flaps and edges and bringing them together.

4. In a machine for making paper containers, two coöperating rotary cutting dies, a folding or creasing roller coöperating with one said die, a shield for deflecting the blank as it comes from the cutting dies, a folder blade oscillating about and with one cutting die, and means for actuating the same to engage the blank intermediately and insert it thus doubled intermediately between the creasing roller and the rotary die coöperating therewith.

5. In a machine for making paper containers in combination, two rotary cutting dies, a creasing roller coöperating with one said die to form a flap at the edge of one-half of the blank, a shield for deflecting the blank, a tension member to engage the forward end of the blank, and a folder blade with means for operating the same to engage the blank intermediately, fold it on itself, thrust it by the shield and insert it between the creasing roller and the rotary die coöperating therewith.

6. In a machine for making paper containers, a plurality of coöperating rotary dies, creasing means coöperating with one said die to form an edge flap, a shield for deflecting the cut blank from the rotary die, a folder blade, means for moving the same at a speed substantially equal to the surface speed of the dies, the same being timed to follow and move with a predetermined intermediate point on the blank causing the blank to be thrust under the shield and folded about a transverse line intersecting said intermediate point, and inserted in the grip of the creasing means.

7. In a machine for making bag-like paper containers, means for cutting the paper consisting of coöperating feeding and cutting dies, creasing means, a shield spaced from one cutting die by a narrow interval, a folding member engaging the blank at an intermediate point, and means for actuating the same to turn the blank about a transverse line through this point, thrusting it by the shield and into operative relation with the creasing means.

8. In a machine for making paper containers, cutting means consisting of a pair of rotary cutting dies, a creasing roller coöperating with one cutting die to form an edge flap, folding means consisting of a shield for deflecting the cut blank from the dies, a support, means for moving the support to grip the forward end of the blank for a period following the end of the cutting operation and corresponding to the folding, a folding blade, means for actuating the same to move at a speed equal to the surface speed of the cutting dies, the same being timed to follow the intermediate portion of the blank causing the same to be turned over the folder blade and thrust between the shield and the die and thence into engagement by the creasing means.

9. In a machine for making paper containers, cutting means consisting of a pair of rotary cutting dies, a creasing roller coöperating with one cutting die to form an edge flap, folding means consisting of a shield for deflecting the cut blank from the dies, a support, means for moving the support to apply tension to the forward end of the blank for a period during the last part of the cutting operation and corresponding to the folding, a folding blade, means for actuating the same causing the blank to be turned over the folder blade and thrust between the shield and the die and thence into engagement by the creasing means, a way for the blanks to receive them from the creasing member, pasting means coöperating with the blanks on said ways, means for feeding the blanks intermittently by the pasting means, a cam to control the pasting member, and a radially placed rib thereon to support the flaps in turned position, the pasting rollers having paste-coated surfaces at right angles to engage the turned flaps and the adjacent portion of the other half of the blank at the same time.

10. In a machine for making paper containers, cutting means consisting of a pair of rotatary cutting dies, a creasing roller coöperating with one cutter die to form each flap, folding means consisting of a shield for deflecting the cut blank from the side, a support, means for moving the support to apply tension to the forward end of the blank for a period during the last part of the cutting operation and corresponding to the folding, a folding blade, means for actuating the same to move at a speed equal to the surface speed of the cutting dies, the same being timed to follow the intermediate portion of the blank causing the same to be turned over the folder blade and thrust between the shield and the die and thence into engagement by the creasing means, a way for the blanks to receive them from the creasing member, pasting means coöperating with the blanks on said ways, means for feeding the blanks intermittently by the pasting means, a cam to control the pasting member, and a radially placed rib thereon to support the flaps in turned position, the pasting rollers having paste-coated surfaces at right angles to engage the turned flaps and the adjacent portion of the other half of the blank at the same time.

11. In a machine for making paper containers or bottle seals, means for cutting the blank composed of two sections, one exceeding the other by a narrow margin, means for turning the margin of the cut blank formed on the larger section about the edges of the smaller section to form a flap, means for coating the flap with paste consisting of a paste roller having two peripheral surfaces substantially at right angles, and means for bringing the blank and rollers into coöperative relation.

12. In a machine for making paper containers or bottle seals, means for cutting a blank composed of two sections, one exceeding the other by a narrow margin, means for turning the margin of the cut blank formed on the larger section above the edges of the smaller section to form a flap, means for coating the flap with paste consisting of a paste roller having two peripheral surfaces substantially at right angles, means for moving the rollers laterally causing them to follow the edge of the blank, and means for supporting the flap in contact with one surface of the rollers, the adjacent margin of the paper being brought into contact with the other surface.

13. In a machine for making paper containers or bottle seals, means for cutting the blank composed of two sections, one exceeding the other by a narrow margin, means for turning the margin to form a flap, the small section of the cutter having a movable section and means for withdrawing the same during the creasing operation, means for coating the flap with paste consisting of a paste roller having two peripheral surfaces substantially at right angles, means for moving the rollers laterally causing them to follow the edge of the blank, and means for holding the flap in contact with one surface of the rollers, the adjacent margin of the paper being brought into contact with the other surface.

14. In a machine for making paper containers or bottle seals, means for cutting the blank composed of two sections, one exceeding the other by a narrow margin, means for turning the margin of the cut blank formed on the larger section about the edges of the smaller section to form a flap, the small section of the cutter having a movable portion and means for withdrawing the same during the creasing operation, and means for coating the flap with paste.

15. In a machine for making paper containers or bottle seals, means for cutting the blank, composed of two sections, one exceeding the other by a narrow margin, means for turning the margin to form a flap, means for coating the flap with paste consisting of a paste roller having two peripheral surfaces substantially at right angles, means for moving the rollers laterally causing them to follow the edge of the blank, means for holding the flap in contact with one surface of the rollers, the adjacent margin of the paper being brought into contact with the other surface, and means for feeding the blanks intermittently causing them to come in contact with the rollers when the latter are spaced to receive them.

16. In a machine for making paper containers in the form of bags, a pair of cutter rollers having coöperating shearing edges, those of one cutter roller being adapted to enter between those of the other, the cutting edges extending in the direction of the periphery of the rollers and being arranged to outline a figure having two similar sections, one exceeding the other in width by a pasting margin, a creasing roller coöperating with the inside cutter roller and having a radially extending rib conforming to the outline of the smaller section to fit over and receive the same, and means for folding the blanks on the dividing line between the sections and feeding them between the internal cutting roller and the creasing roller so that they overlie the small section of the cutter roller, the flap overhanging the same and being creased or turned by the action of the creasing roller.

17. In a machine for making paper containers in the form of bags, a pair of cutter rollers having coöperating shearing edges, those of one cutter roller being adapted to enter between those of the other, the cutting edges extending in the direction of the periphery of the rollers and being arranged to outline a figure having two similar sections, one exceeding the other in width by a pasting margin, a creasing roller coöperating with the inside cutter roller and having a radially extending rib conforming to the outline of the smaller section to fit over and receive the same, and means for folding the blanks on the dividing line between the sections and feeding them between the internal cutting roller and the creasing roller so that they overlie the small section of the cutter roller, the flap overhanging the same and being creased or turned by the action of the creasing roller, parts of the smaller cutter section being movable.

18. In a machine for making paper containers in the form of bags, a pair of cutter rollers having coöperating shearing edges, those of one cutter roller being adapted to enter between those of the other, the cutting edges extending in the direction of the periphery of the rollers and being arranged to outline a figure having two similar sections, one exceeding the other in width by a pasting margin, a creasing roller coöperating with the inside cutter roller and having a radially extending rib conforming to the outline of the smaller section to fit over and receive the same, means for folding the blanks on the dividing line between the sections and feeding them between the internal cutting roller and the creasing roller so that they overlie the small section of the cutter roller, the flap overhanging the same and being creased or turned by the action of the creasing roller, parts of the smaller cutter section being movable, and means for withdrawing the same.

19. In a machine for making paper containers or seals, an internal cutting roller, an external cutting roller, the internal cutting roller being made in sections spaced apart centrally, cutting edges on the rollers arranged to cut blanks and spaced apart to leave a connecting tab or web, and a cutter operating in the space between the sections of the internal cutting roller to cut the tab when the blanks have drawn the web into the grip of the cutting rollers.

20. In a machine for making seals or bags of paper, an external cutting roller or rotary die made in sections and having the edges of the separate sections oppositely disposed, a shaft for said roller, and means for adjusting the cutting edges as to their distance apart consisting of an abutment secured to the shaft at one side of the roller, means secured to the shaft at the other side, and a screw seated therein and bearing on the adjecent section of the cutting roller.

21. In a machine for making bags or seals of paper, three rollers consisting of two coöperating cutting rollers and a creasing roller, the cutting rollers having internal and external cutting edges arranged in two lobes or sections, one lobe of each roller exceeding the other in width by a pasting margin, the internal cutting roller coöperating in gripping relation with the creasing roller, the same being provided with creasing surfaces placed and formed to fit over the cutting edges of the smaller section on the internal cutting roller with means for doubling the blank and feeding it between the internal cutting roller and the creasing roller in position to overlie the smaller section of the cutting member, the creasing surfaces coöperating with said cutting member to crease the edges of the wider section of the blank over the cutting edges of the smaller lobe of the cutter forming them into a flap.

22. In a machine for making bags or seals of paper, three rollers consisting of two coöperating cutting rollers and a creasing roller, the cutting rollers having internal and external cutting edges arranged in two lobes or sections, one lobe of each roller exceeding the other in width by a pasting margin, the internal cutting roller coöperating in gripping relation with the creaser roller, the same being provided with creasing surfaces placed and formed to fit over the cutting edges of the smaller section of the internal cutting roller with means for doubling the blank and feeding it between the internal cutting roller and the creasing roller in positioin to overlie and register with the smaller section of the cutting member, the creasing surfaces coöperating with said cutting member to crease the edges of the wider section of the blank, forming them into a flap, ways receiving the blanks from the latter named rollers, pasting rollers, each having two peripheral surfaces at right angles coöperating with the creased flap and the adjacent margin of the smaller half of the blank, and means for feeding the blank to said rollers and holding the flaps in contact with the pasting rollers.

23. In a machine for making bags or seals of paper, three rollers consisting of two coöperating cutting rollers and a creasing roller, the cutting rollers having internal and external cutting edges arranged in two lobes or sections, one lobe of each roller exceeding the other in width by a pasting margin, the internal cutting roller coöperating in gripping relation with the creaser roller, the same being provided with creasing means placed and formed to fit over the cutting edges of the smaller section of the internal cutting roller with means for doubling the blank and feeding it between the internal cutting roller and the creasing roller in position to overlie and register with the smaller section of the cutting member, the creasing means coöperating with said cutting member to crease the edges of the wider section of the blank, forming them into flaps, ways receiving the blanks from the latter named rollers, pasting rollers each having two peripheral edges at suitable angles coöperating with the creased flap and the adjacent margin of the smaller half of the blank, means for feeding the blank to said rollers, said means also including a cam, a follower connected to each pasting roller to actuate the pasting roller by means of the cam to move laterally so as to conform to the outline of the blank, the same being of different widths at different points in its length.

24. In a machine for making paper containers, a pair of cutter rollers, cutting edges on both said rollers, the cutting edges on one roller taking over and inclosing the cutting edges on the other roller, this relation of the cutting rollers being maintained throughout the operation of the machine, and means for adjusting the cutting edges on the two rollers by drawing the outside cutting edges against the inside cutting edges.

25. In a machine for making paper containers or seals, a roller carrying internal cutting edges, a roller carrying external cutting edges, the external cutting edges taking over the internal cutting edges, the latter roller being made in sections, a shaft for said roller, one section being mounted to slide on said shaft toward and from the other, and means for adjusting the contact between the internal and external cutting edges, drawing the external cutting edges together by applying tension to the shaft.

26. In a machine for making paper containers, an external cutting roller or rotary die made in sections, a shaft for said roller, one of said sections being mounted to slide along the shaft, cutting edges on said sections, a coöperating internal cutting die having cutting edges fitting inside the cutting edges of the external die, and means for adjusting the cutting edges of the external die in contact with those of the internal die by applying tension to the shaft.

27. In a machine for making paper containers, a pair of cutting rollers, cutting edges on both said rollers, the cutting edges on one roller taking over the cutting edges on the other roller, a shaft for the roller carrying the ouside cutting edges, said roller being composed of a plurality of separate members, two of said members being keyed to the shaft and mounted to slide thereon, each said member carrying one portion of the cutting edge, means on the shaft on the outer side of one of said latter members to limit the motion thereof along the shaft, an abutment secured to the shaft outside of the other said member, and a screw in said abutment bearing against said latter member whereby the relation of the cutters is determined by drawing the outside cutting edges together.

Signed by me at Baltimore, Maryland, this 7th day of February, 1918.

WALTER M. INGRAM.

Witnesses:
PORTER H. FLAUTT,
ZELLA KUHN.